(12) United States Patent
Rohs et al.

(10) Patent No.: US 6,299,539 B1
(45) Date of Patent: Oct. 9, 2001

(54) FRICTION PLATE DAMPER (75) Inventors: Ulrich Rohs; Hans Rohs, both of Düren; Dietmar Heidingsfeld, Aachen, all of (DE)

(73) Assignee: Rohs Voigt Patentverwertungs-gesellschaft mbH, Düren (DE)

( * ) Notice: Subject to any disclaimer, the term of this patent is extended or adjusted under 35 U.S.C. 154(b) by 0 days.

(21) Appl. No.: 09/296,717

(22) Filed: Apr. 22, 1999

(30) Foreign Application Priority Data

Apr. 22, 1998 (DE) .............................. 198 17 907

(51) Int. Cl.$^7$ ...................................... F16D 3/82
(52) U.S. Cl. ................ 464/68; 192/201; 192/213.21; 192/213.11; 464/54; 464/84; 464/61
(58) Field of Search .................. 464/54, 61, 67, 464/84, 66, 68; 192/201, 213.21, 213.11

(56) References Cited

U.S. PATENT DOCUMENTS

| | | | | |
|---|---|---|---|---|
| 3,058,556 | * | 10/1962 | Marland | 192/45 |
| 4,787,612 | * | 11/1988 | Ball et al. | 267/273 |
| 4,924,990 | * | 5/1990 | Takeuchi | 192/201 |
| 5,201,394 | * | 4/1993 | Suzuki | 464/68 |
| 5,816,924 | * | 10/1998 | Kajitani et al. | 464/66 |

FOREIGN PATENT DOCUMENTS

| | | |
|---|---|---|
| 2932531 | 2/1981 | (DE) . |
| 3107371 | 9/1982 | (DE) . |
| 3203648 | 9/1982 | (DE) . |
| 3610735 | 10/1986 | (DE) . |
| 3542491 | 6/1987 | (DE) . |
| 3718848 | 12/1988 | (DE) . |
| 3743801 | 7/1989 | (DE) . |
| 3806013 | 9/1989 | (DE) . |
| 4433467 | 3/1995 | (DE) . |
| 3418671 | 5/1996 | (DE) . |
| 19544832 | 6/1997 | (DE) . |
| 19611268 | 9/1997 | (DE) . |
| 1.598.557 | 8/1970 | (FR) . |
| 2.169.989 | 7/1986 | (GB) . |

* cited by examiner

Primary Examiner—Lynne H. Browne
Assistant Examiner—Aaron M Dunwoody
(74) Attorney, Agent, or Firm—Collard & Roe, P.C.

(57) ABSTRACT

A compact friction plate damper having a primary plate and a secondary plate, which interacts by means of a friction element. A speed-dependent control device is provided for the friction, wherein the friction device has a contact arrangement upon which force is to be exerted essentially radially. The friction control device comprises a spring element, which takes effect with rotational speed-dependent force on the contract arrangement in an essentially radial manner. In addition to this, the friction device interacts by friction with the secondary plate, and is mounted so as to be rotationally movable in relation to the primary plate by at least a small angle. Thus the friction control comprises a rotational speed-dependent coupling element between the primary plate and the friction device.

24 Claims, 13 Drawing Sheets

TRACTION 0°

THRUST 0°

FIG. 6

TRACTION 8°

FIG. 7

TRACTION 12°

FIG. 8

TRACTION 23°

THRUST −7°

FIG. 11

THRUST −15°

FRICTION PLATE DAMPER

BACKGROUND OF THE INVENTION

1. Field of the Invention

The invention relates to a friction plate damper with a primary plate and a secondary plate, which interact with each other by means of a friction device, and a control device for the friction which is dependent on the speed of rotation.

2. Description of the Prior Art

A friction plate damper of this nature is known, from German Patent DE 196 11 268 A1. With this friction plate damper, a primary section supports a number of lamellar rings, arranged axially behind one another. These rings are capable of being moved, which in each case engage between axially movable lamellar rings connected to the secondary section. As a result the lamellar rings are pressed against each other by leaf springs having centrifugal weights exerting axial pressure, at the outer axial ends. As a result, a pressure force is exerted on the lamellar rings, which decreases as the speed of rotation decreases, with the result that the pressure force and therefore also the friction force reverts to zero once a critical speed of rotation is exceeded.

SUMMARY OF THE INVENTION

The centrifugal weights, however, require a relatively large space, thus, the space available for the damping springs is reduced. The objective of the invention is to provide a friction plate damper with a primary plate and a secondary plate, which interact by means of a friction device. In addition, a control device is provided for the friction, dependent on the speed of rotation, in which sufficient space is provided for damping springs.

As a solution, the invention proposes a friction plate damper of a generic nature, in which the friction device features a contact arrangement, to be imposed essentially radially. In addition, the friction control device comprises a spring element, which takes effect essentially radially on the contact arrangement.

In contrast with the known arrangements, in which the friction is controlled by means of axially imposed contact, this invention allows for the avoidance of a complex mechanism which occupy considerable space, taking effect radially and converting centrifugal forces into axial forces. Rather, the spring element can take effect directly on the contact arrangement, in which situation its pressure forces are defined by centrifugal forces and are dependent on the rotational speed without further measures being required.

To advantage, the contact arrangement is subjected to force by means of the spring element radially from outside, at low rotational speeds of the friction plate damper. At low rotational speeds, this incurs a high friction force and therefore a high degree of damping, which is necessary to avoid the rotational speed acceleration being excessive between the primary and secondary plates, in particular at resonance penetration.

At high rotational speeds, the spring element exerts centrifugal forces, so that the forces exerted on the contact arrangement, and therefore also the friction, are reduced. In this way, at high rotational speeds the damping is reduced in the desired manner. In addition, a relative movement, as far as possible free of friction, is guaranteed between the primary and secondary plates.

A particularly complex embodiment of this arrangement is obtained if the friction device interacts by way of friction with the secondary plate, at least at low rotational speed, and the primary plate is connected by way of a drive. In this context, it is understood that the drive connection between the friction device and the primary plate does not have to be a rigid connection. This can be provided for preference by way of a spring arrangement, e.g. also by means of the damping springs or by means of a coupling element dependant on the rotational speed.

To achieve these objects the invention includes a generic friction plate damper, in which the friction device interacts by way of friction with the secondary plate. The plate is mounted so that is capable of rotational movement in relation to the primary plate at least within a small angle. In addition, the friction control device comprises a coupling element, dependent on the rotational speed, between the primary plate and the friction device.

An arrangement of this nature also guarantees a compact structure for the friction plate damper. With the arrangements according to the prior art the forces required for the friction are created by the friction control device. Instead, in the present invention, the coupling element is rotational speed dependent, and requires only the forces required to carry the friction device in sympathy. For this reason it can be designed to be considerably more compact.

The rotationally-movable mounting of the friction device in relation to the primary plate provides a degree of freedom of the friction device in relation to the primary plate. This occurs when the coupling element, rotational speed dependent, releases the coupling of the primary plate and the friction device.

The rotational speed dependent coupling element preferably encompasses a spring element taking effect radially. In this way, this design can be realized more simply.

The radially effective spring element imposes force radially from the outside onto a contact arrangement of the friction device and/or of the primary plate. Thus, a rotational speed dependent coupling is created, which is released at high rotational speeds. As a result, in a relatively simple manner a high degree of damping at low rotational speeds, and a low degree of damping at high rotational speeds can be guaranteed. This result, as already explained, is desirable for this type of friction plate damper.

To achieve a reliable drive connection between the primary plate and the friction device, the radially effective spring element can be connected, for the purpose of rotational drive, by means of a carrier element of the primary plate or the friction device, with either the primary plate or the friction device.

Therefore, with this invention, it is not relevance whether the primary plate or the secondary plate is the driving element or the driven element of the friction plate damper. In addition to this, this invention can be used for other types of torsion vibration dampers.

A control device for the friction can be created in a simple manner by the friction plate damper featuring media which limit the relative rotation between friction device and secondary plate in at least one direction. In this way, the defined friction between the friction device and the secondary plate occurs only at this point between the friction device and the secondary plate, while rotational movements extending beyond this, between the primary plate and the secondary plate, and therefore also with other friction coefficients, can be encountered.

A simple arrangement to limit the relative position is attained if the limiting media encompass a stop on the friction device and a stop on the secondary plate, which come into mutual contact at a specific angle of rotation.

The radially effective spring element engages by friction with the contact arrangement, which is to be applied essentially radially. This has the advantage that it will lift off the contact device easily at the appropriate rotational speed. With this arrangement in particular, a friction displacement between the spring element and the contact arrangement is possible. Thus, for example, if a relatively high torque is applied, and a relative rotation between the friction device and the secondary plate is restricted, the friction device will be displaced in relation to the primary plate despite the spring element being in contact. This occurs at a relatively high resistance, which meets the requirement for attaining a high damping effect at low rotational speed and high torque values. As soon as the rotational speed exceeds a specific value, the spring element is released and the friction between the friction device and the primary plate drips to a desired low value.

An especially compact arrangement of a friction plate damper is created if the friction device encompasses a friction plate which comes in contact under friction with a radial surface on the secondary plate. With an arrangement such as this, the outer edge of the friction plate can serve as the contact arrangement which is to take effect essentially radially.

The friction plate is designed as soft in the axial direction, to guarantee a good contact between the friction plate and the secondary plate.

On the other hand, it is also of advantage if the friction plate is designed as rigid in its plate levels. This allows for twist or torsion to be reduced, and a good damping effect of the arrangement as a whole is ensured.

A space-saving arrangement can be attained if the spring element encompasses a spring ring which is capable of extension in the radial direction. A spring ring of this nature may be in contact, at its radial circumference, with one or more essentially radially effective contact arrangements. In this situation, a spring ring of this nature requires only a small amount of space, and can, in particular, be provided for outside the area for the damping springs of the friction ring damper. An arrangement such as this accordingly does not restrict the space available for the damping springs, or only very slightly.

In particular, the spring ring may comprise a slot ring, for preference made of metal. If the spring ring further features a spring which is located on both sides of the slot in the ring, and which compresses the ring at its end which delimits the slot, an especially economical arrangement is created, which nevertheless provides the spring and pressure forces required.

On the other hand, the slot ring may also be encompassed radially on the outside by a circumferential spring, for preference a helical spring or a leaf spring. In addition to this, the spring ring, irrespective of the presence of a slotted ring, may also comprise a meandering strip or a meandering square plate, in which situation additional spring elements, such as helical springs or leaf springs may be arranged on the strip or square plate.

The spring ring features at least one module made of brass, or consists entirely of this material. This has the advantage that, because of the high deadweight of brass, sufficiently high centrifugal forces will already be generated at low resolution speeds. It is self-evident that, instead of brass, other materials with a similarly high or higher deadweight can be selected. This should be higher than the deadweight of steel.

To facilitate the fitting of the spring ring, it may feature a convex surface which is radial on the inside in its cross-section. In this way, it can be pushed more simply onto the module on which it is mounted, such as, the contact arrangement or arrangements. For the same reason, it is advantageous if the contact system of the friction device features a concave surface on the radial exterior. In this way, the spring ring can be introduced during fitting through the concave surface of the hemisphere, and so rests in a stable manner on the contact system.

The terms "concave" and "convex" surface in this connection are to be understood in a very broad sense. This also encompasses in particular, polygonal surface structures and surface part areas which are arranged or oriented in a convex or concave manner.

By one variation of the surface areas which come in contact, the spring element or the speed-dependent coupling element and contact arrangement of the friction device, the friction between the contact arrangement of the friction device and the spring element or the speed-dependent coupling element respectively can be adapted to suit the particular requirements. This can be achieved in particular by a variation of the surface inclination of the contact arrangement.

In addition, it is also possible for a defined friction to be provided between the friction device and the primary plate, so that when the spring element or the speed-dependent coupling element is released, certain basic friction will pertain between the primary plate and the friction device.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference numerals denote similar elements throughout several views.

FIG; 5. shows a first angle of rotation between primary plate and secondary plate.

DETAILED DESCRIPTION OF THE PREFERRED EMBODIMENT

Figure 1:
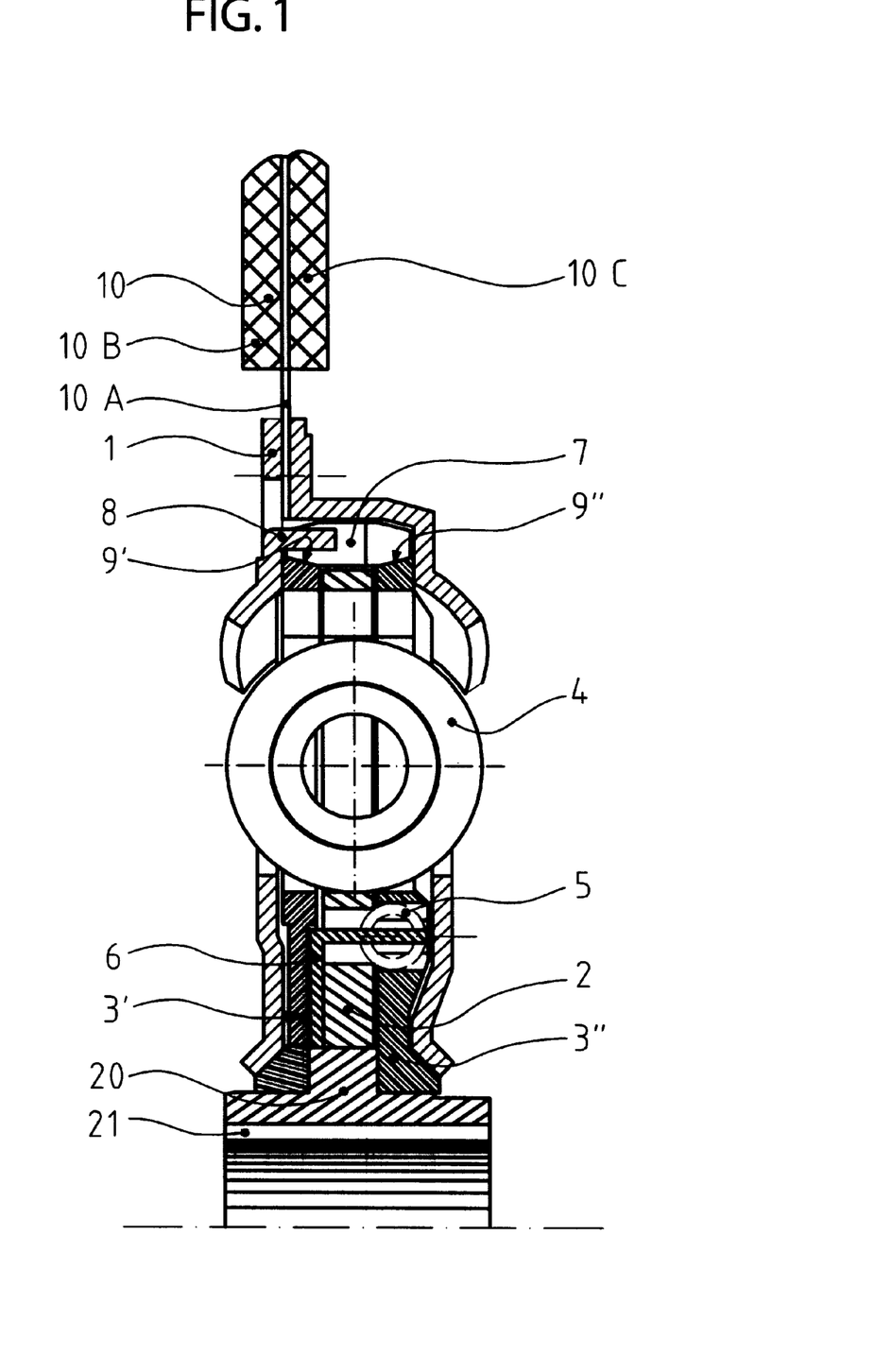
FIG. 1 shows the friction plate damper in a sectional view along the line I—I according to FIG. 2.

The friction plate damper as shown in FIG. 1 comprises primary plate 1, to which a coupling friction plate 10 is secured by securing device 10A to two coupling friction plate surfaces 10B and 10C. The primary plate 1 interacts by means of two friction plates 3' and 3" and four damping springs 4 and four preliminary damping springs 5, with a secondary plate 2, which is located on cam 20 of a gear train element 21.

In this context, the secondary plate 2 is designed essentially in the shape of a disk, and is surrounded in the axial direction on both sides by a friction plate 3' and 3". The primary plate 1 likewise features two disks, which in turn surround the two friction plates 3' and 3" in the manner of a sleeve.

Figure 2:
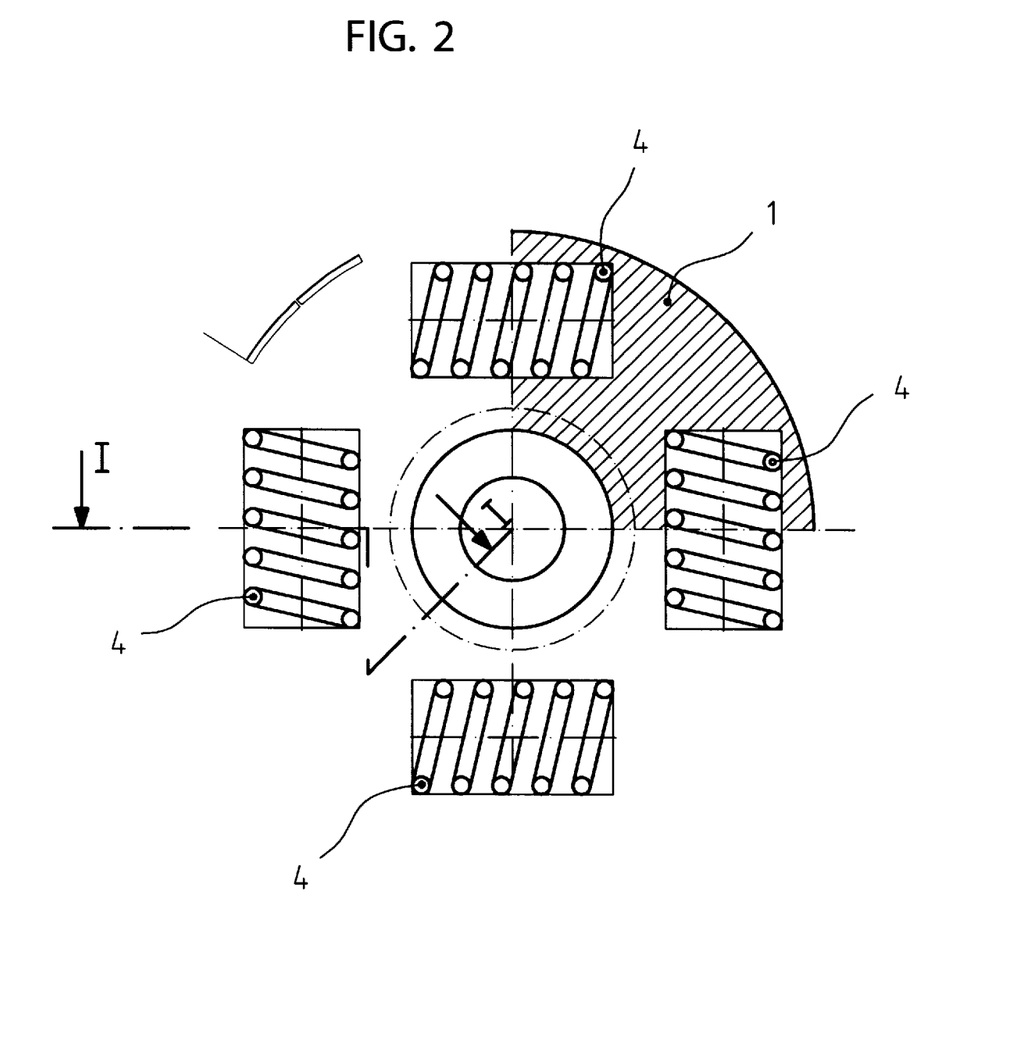
FIG. 2 shows the primary plate of the friction plate damper according to FIG. 1, in a schematic side view.
Figure 3:
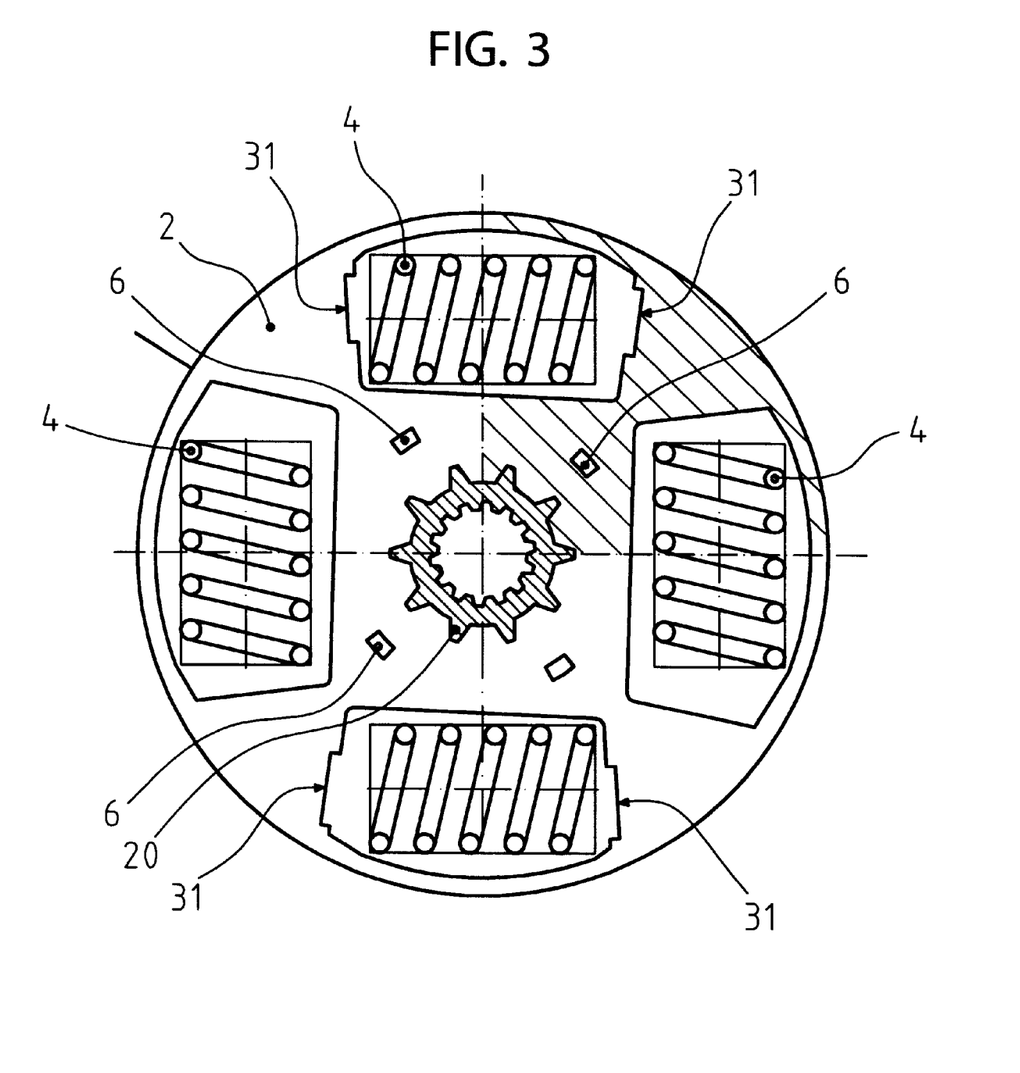
FIG. 3 shows the secondary plate of the friction plate damper according to FIG. 1, in a schematic side view.
Figure 4:
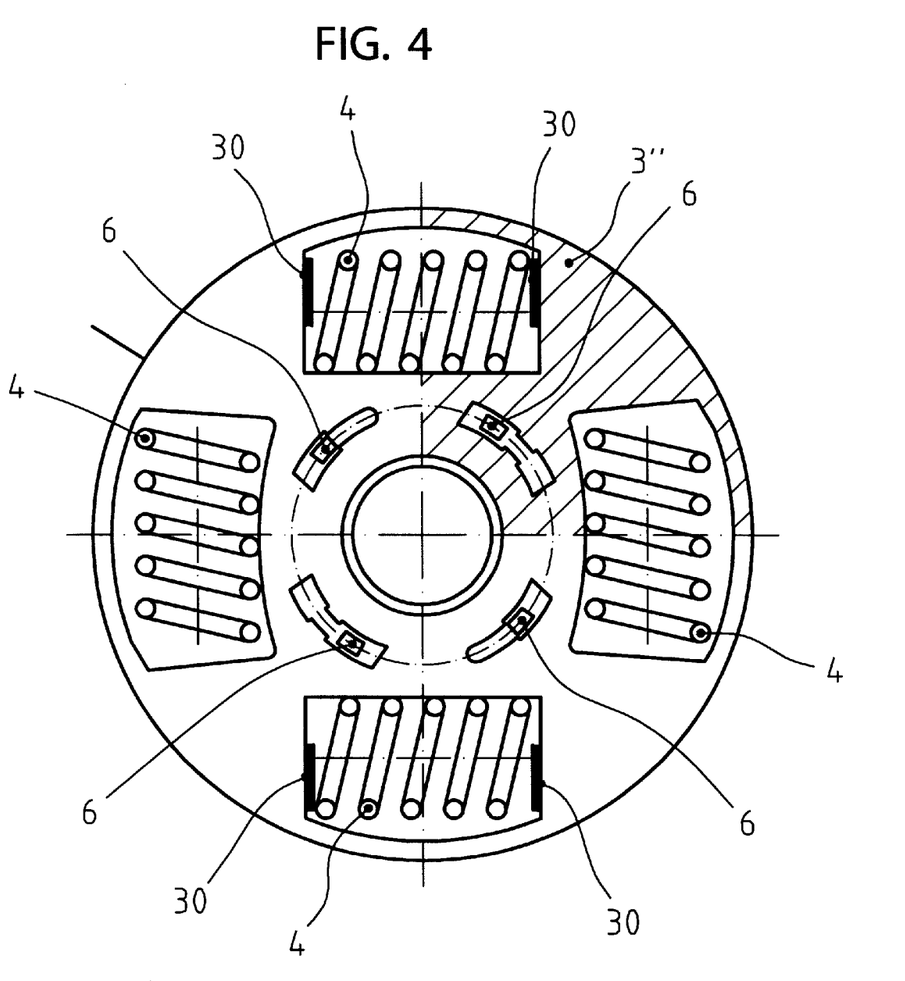
FIG. 4 shows the right-hand friction plate of the friction plate damper according to FIG. 1, in a schematic side view.
Figure 5:
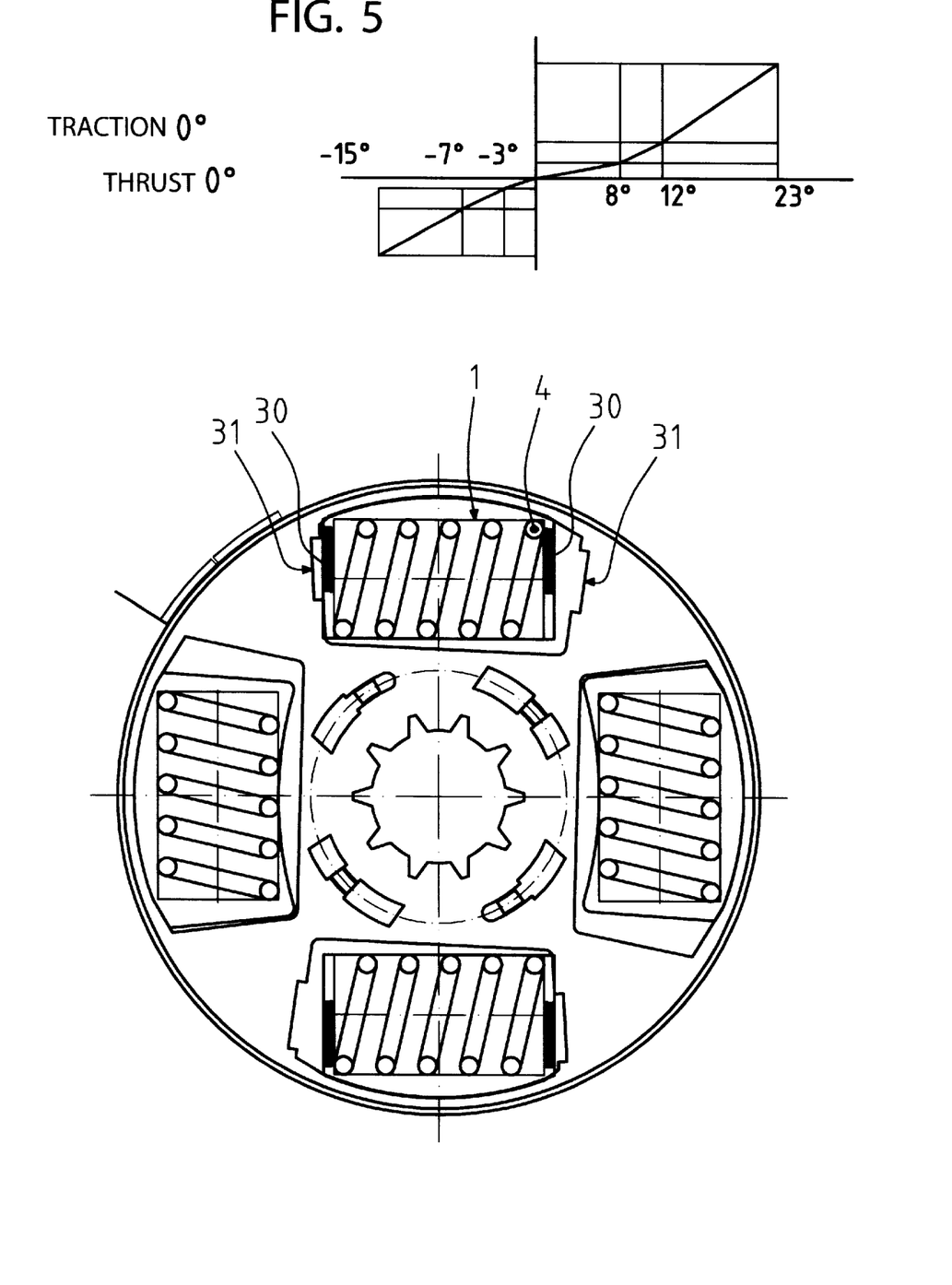

As can be seen from FIGS. 2 to 4 in particular, each of the disks features window apertures, in which the four damping springs 4 are arranged.

In addition, the secondary plate 2 has carrier elements 6, which engage in the four preliminary damping springs 5 (see FIG. 1), which in turn are arranged in cut-outs in the right-hand friction plate 3".

In two of the friction plate apertures for the damping springs 4, stops 30 are provided. These stops 30 are disposed in the corresponding cut-outs 31 in the secondary plate 2 (see FIGS. 3 and 4). In addition to this, the stops 30 are spaced apart in such a way that the corresponding damping springs 4 can find space between them just in the relaxed state. The same also applied to all the window apertures of the primary plate 1. The other apertures are designed to be larger, with the result that the distribution of force, described hereinafter on the basis of FIGS. 5 to 11, is derived when the primary plate 1 and the secondary plate 2 are rotated against one another.

Stops 30 and the window apertures in the primary plate 1 correspond in their size to the relaxed damping springs 4, when the friction plate damper is not subjected to torque. These friction plates 3' and 3" are directed into a neutral position in relation to the primary plate 1. The same thing occurs from preliminary damper springs 5 between the secondary plate 2 and the friction plates 3', 3". In this context, the friction plate damper, if not subjected to a torque force, will be the initial position shown in FIG. 5.

Figure 6:
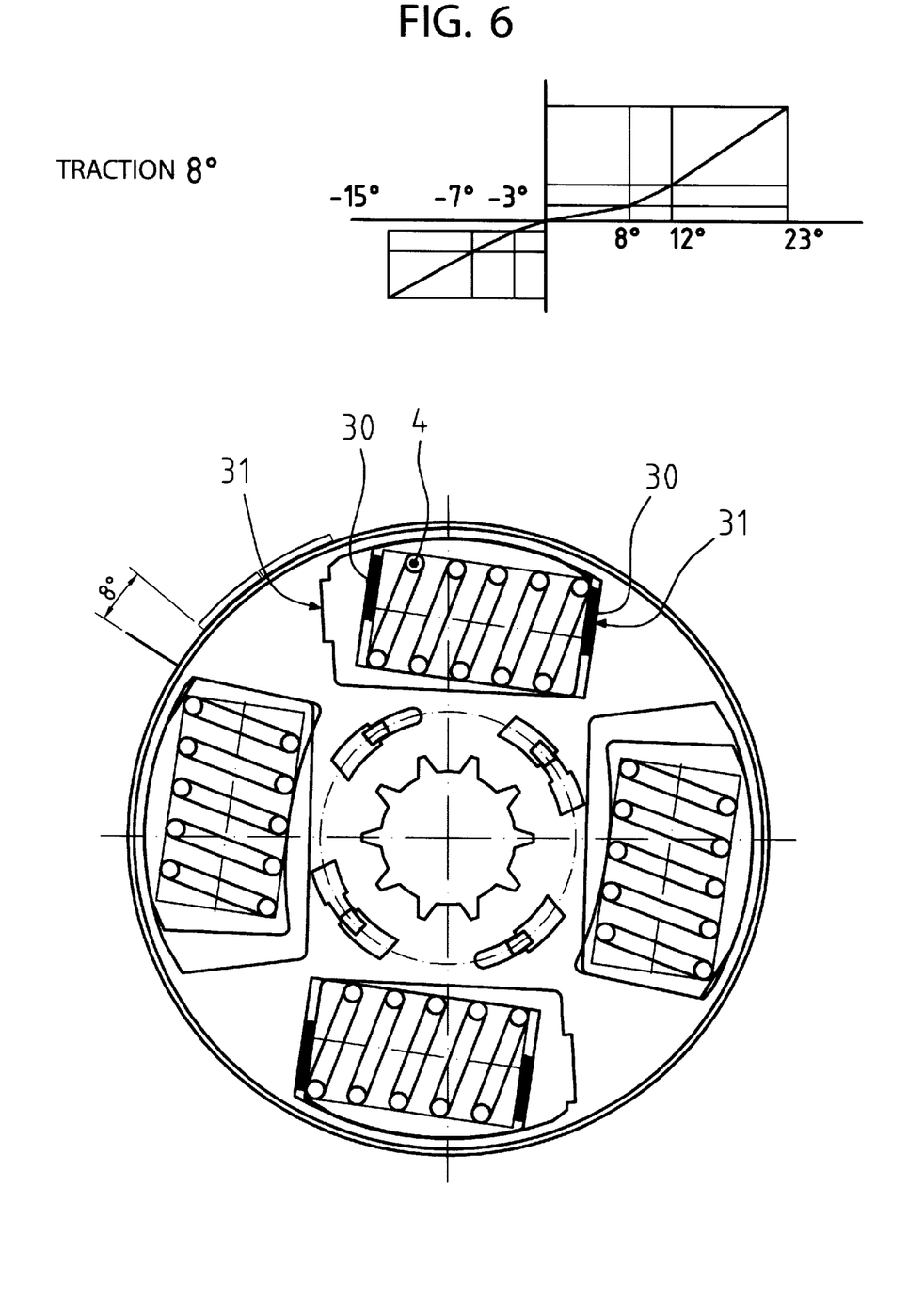
FIG. 6. shows a second angle of rotation between the primary plate and the secondary plate.
Figure 7:
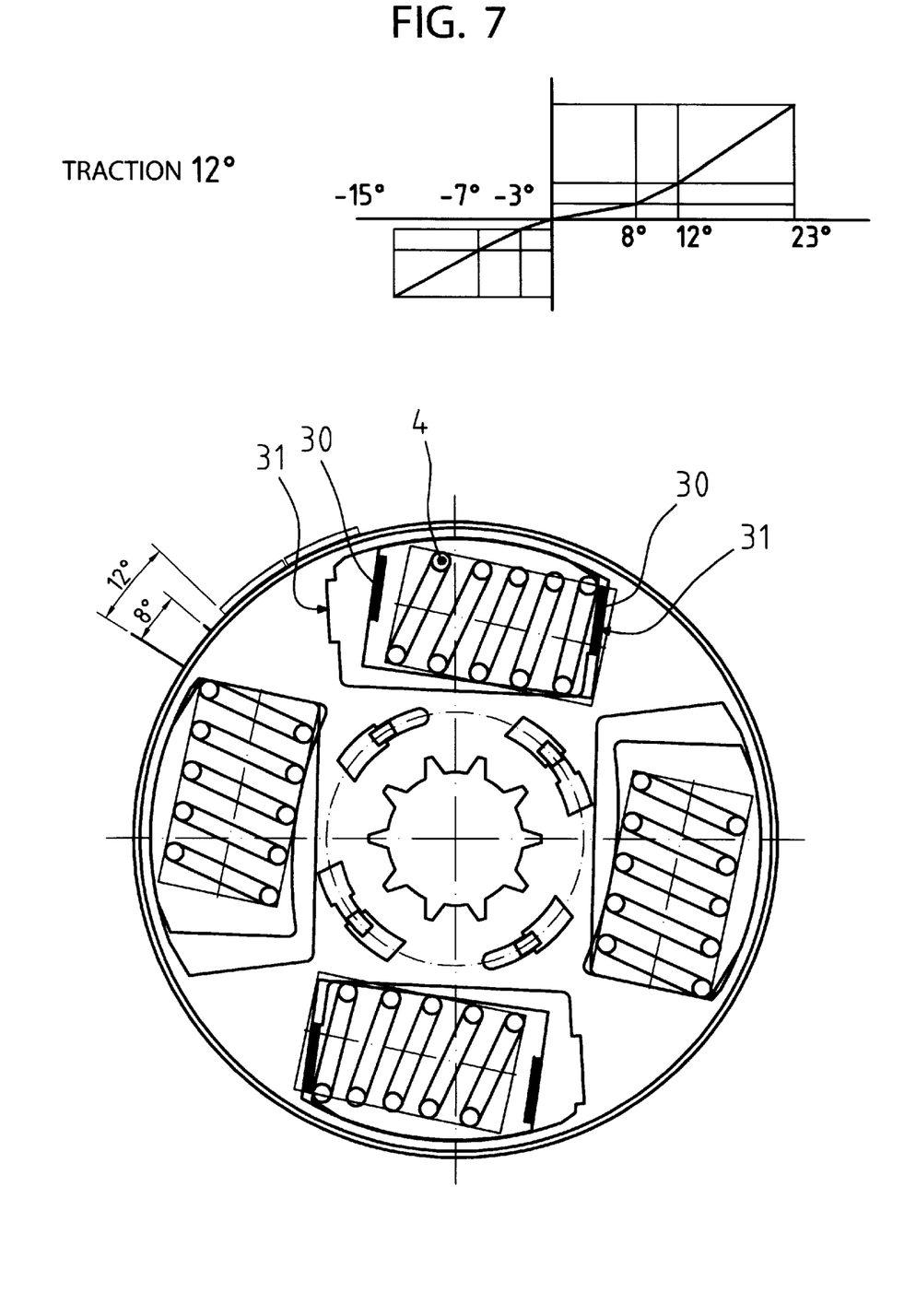
FIG. 7 shows a third angle of rotation between the primary plate and the secondary plate.
Figure 8:
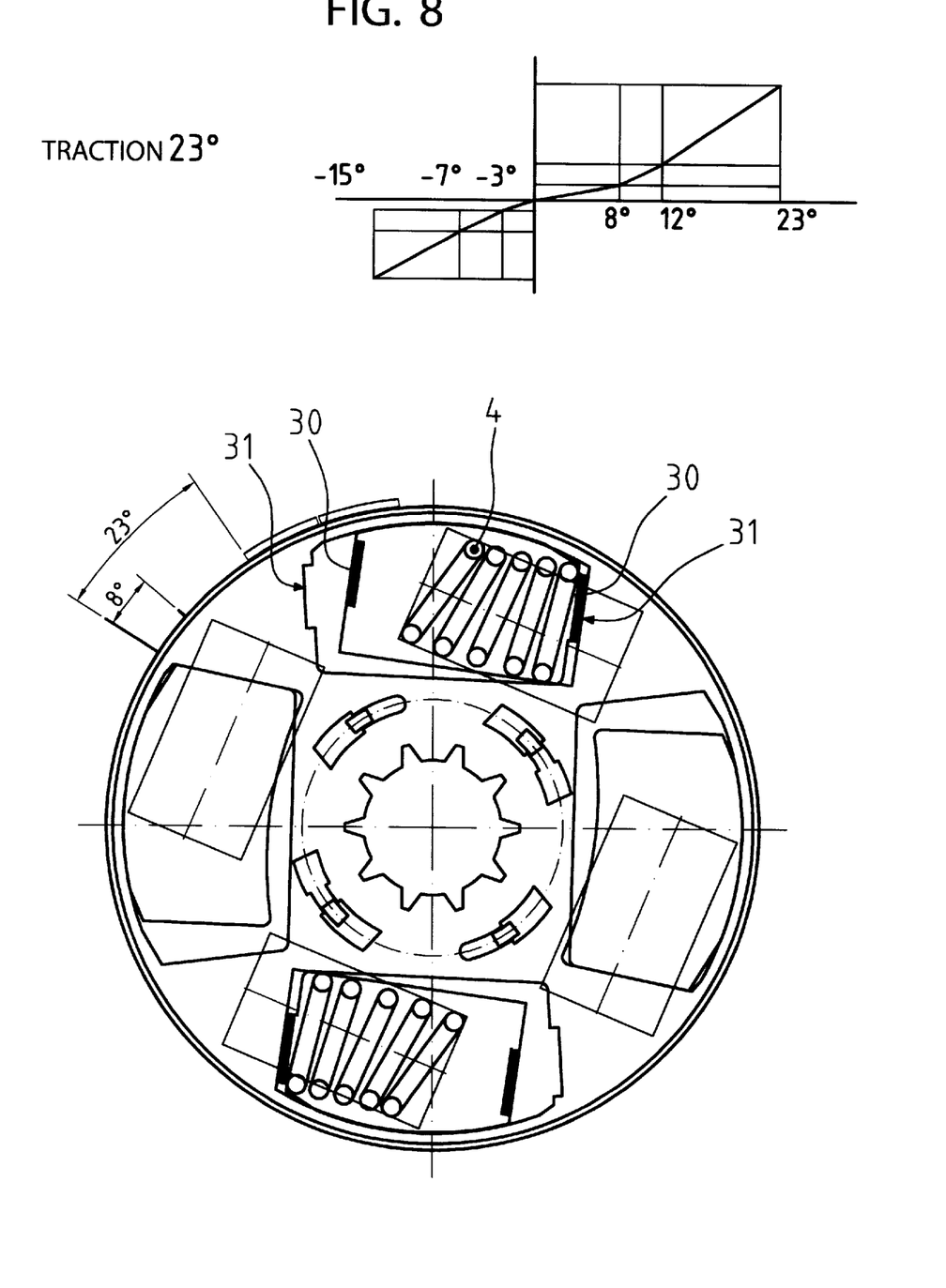
FIG. 8 shows a fourth angle of rotation between the primary plate and the secondary plate.
Figure 9:
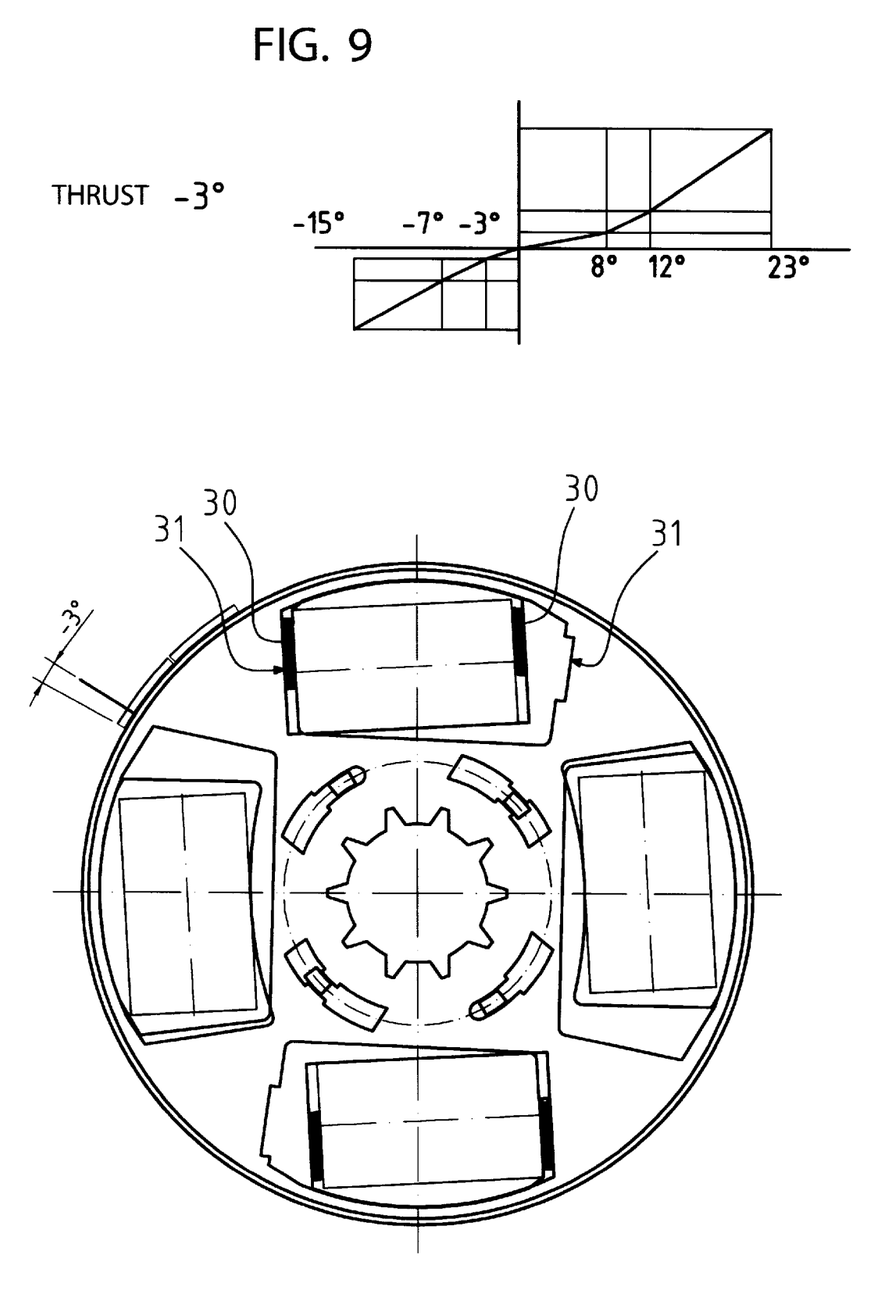
FIG. 9 shows a fifth angle of rotation between the primary plate and the secondary plate.
Figure 10:
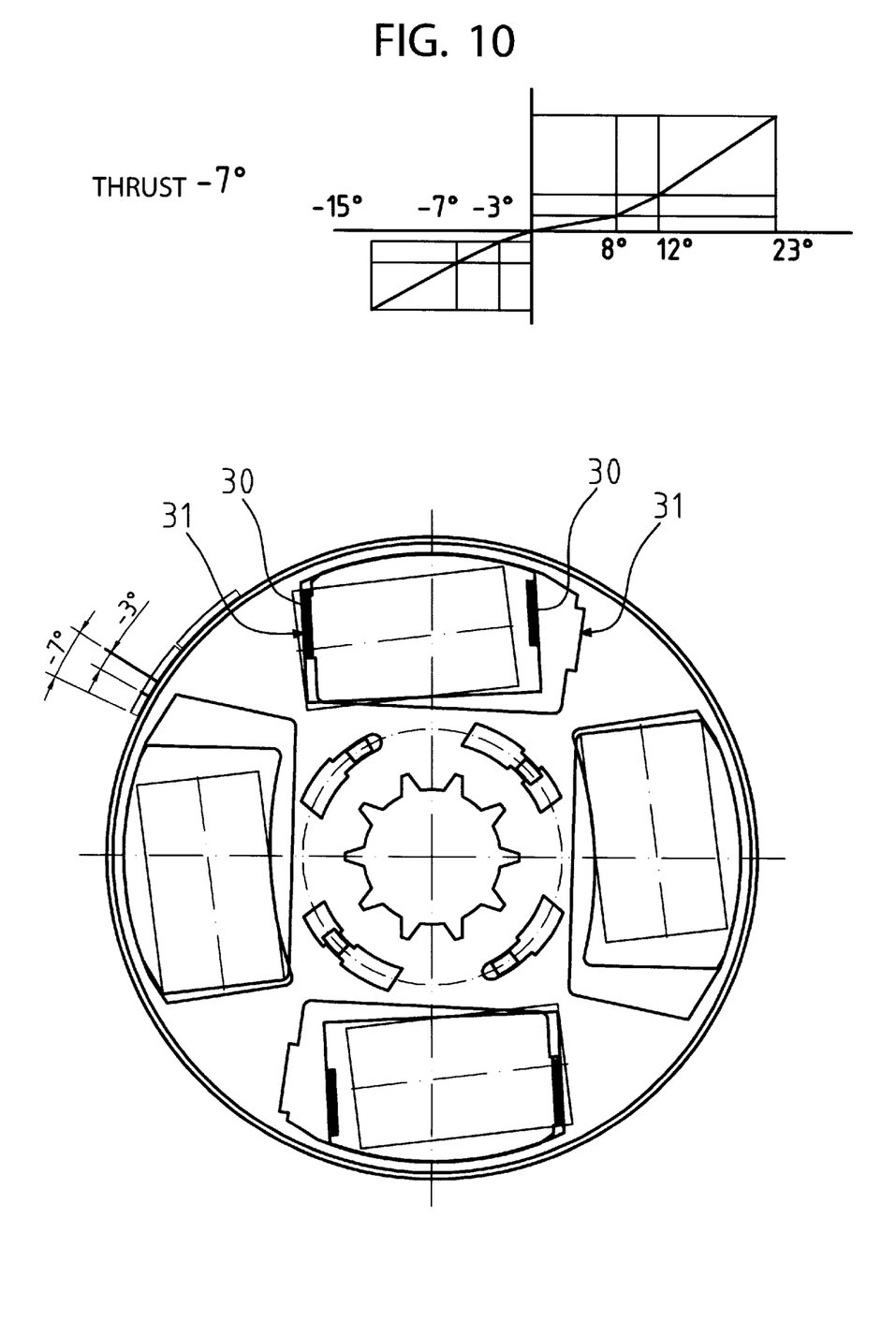
FIG. 10 shows a sixth angle of rotation between the primary plate and the secondary plate.
Figure 11:
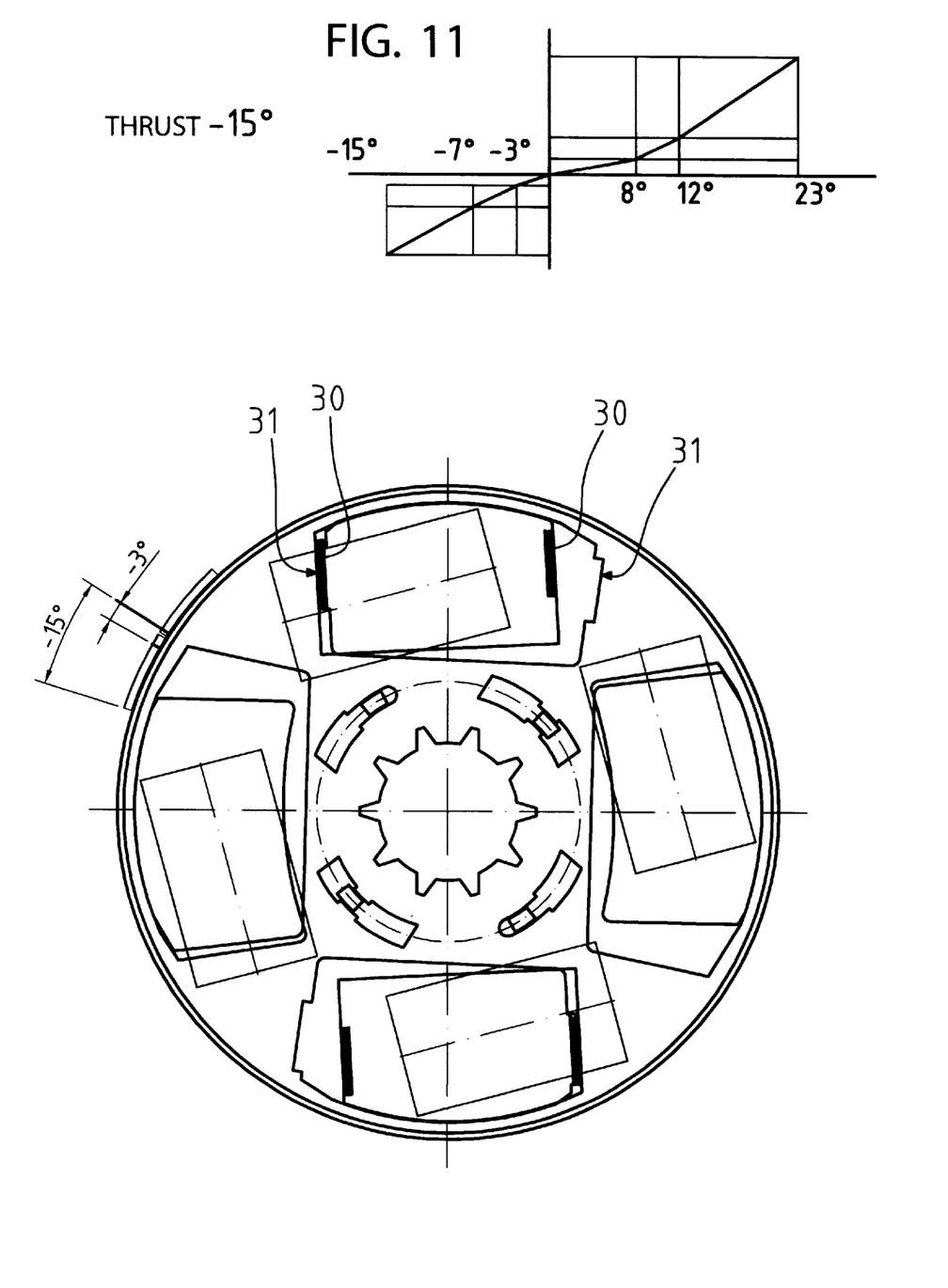
FIG. 11 shows a seventh angle of rotation between the primary plate and the secondary plate.

As shown in FIGS. 6 and 9, the friction plates 3', 3" can move between 8° in traction and −3° in thrust, in relation to the secondary plate 2, backwards and forwards. With these angles, the stops 30 come into contact in the cut-outs 31 of the secondary plate 2, and further rotation between the friction plate 3' and 3" and the secondary plate 2 is excluded. From the angles, accordingly, the preliminary damper springs 5, which take effect between the friction plate 3' and 3" and the secondary plate 2, no longer apply.

In the case of larger angles of rotation, the damping springs 4 are compressed (see FIGS. 7, 8, 10, and 11). In this context the window apertures are designed so that initially only two of the damping springs 4 are compressed (see FIGS. 7 and 10). Only at very high angles of rotation between the primary plate 1 and the secondary plate 2 are all the damping springs 4 compressed (see FIGS. 8 and 11). As a result, the effect spring constants between the primary plate 1 and secondary plate 2 match the requirements particularly precisely, and rise in corresponding increments.

A correspondingly fine adjustment of the friction occurs mainly by a spring ring 7 (see FIG. 1), which, as a rotational speed-dependent coupling element, couples the friction plates 3' and 3" to the primary plate 1. To achieve this, the spring ring 7 is in contact with two contact arrangements 9' and 9" of the friction plates 3' and 3", to which force is to be applied in an essentially radial fashion. The two contact arrangements 9' and 9" are directed so that an overall contact arrangement is formed with a concave surface, in which the spring ring 7 rests. The spring ring 7 itself features a convex cross-section, so that it is in stable contact with the contact arrangements 9' and 9", and can be fitted in a simple manner.

In addition, the primary plate 1 features a carrier element 8, which engages with the spring ring 7.

At low rotational speeds, the spring ring 7 is in friction contact with the contact arrangements 9' and 9" of the friction plates 3' and 3", and in this way couples the friction plates 3' and 3" to the primary plate 1. In this context, at low rotational speeds and angles of rotation of between −3° and +8°, the damping behaviour of the friction plate damper is dominated by the friction between the friction plates 3' and 3" and the secondary plate 2, and by the preliminary damper springs 5. At higher angles of rotation, and likewise at lower rotation speeds, by contrast, the damping springs 4 dominate the damping behavior, and the friction between the primary plate 1 and the spring ring 7 respectively, and the friction plate 3' and 3".

At high rotational speeds, by contrast, the spring ring 7 lifts off the contact arrangements 9' and 9", and the primary plate 1 and the friction plates 3' and 3" are accordingly uncoupled. Accordingly, at high rotational speeds and angles of rotation of between −3° and +8°, both the damping springs 4 and the preliminary damping springs 5, and the low friction coefficient between the primary plate and the friction plates 3' and 3", come into effect. At higher angles of rotation, only the preliminary damping springs 5 no longer take part in this characteristic behaviour. In this context, at higher rotational speeds a substantially lower amount of friction, and therefore substantially lower damping, are guaranteed, as is also required of friction plate dampers of this type.

Figure 12:
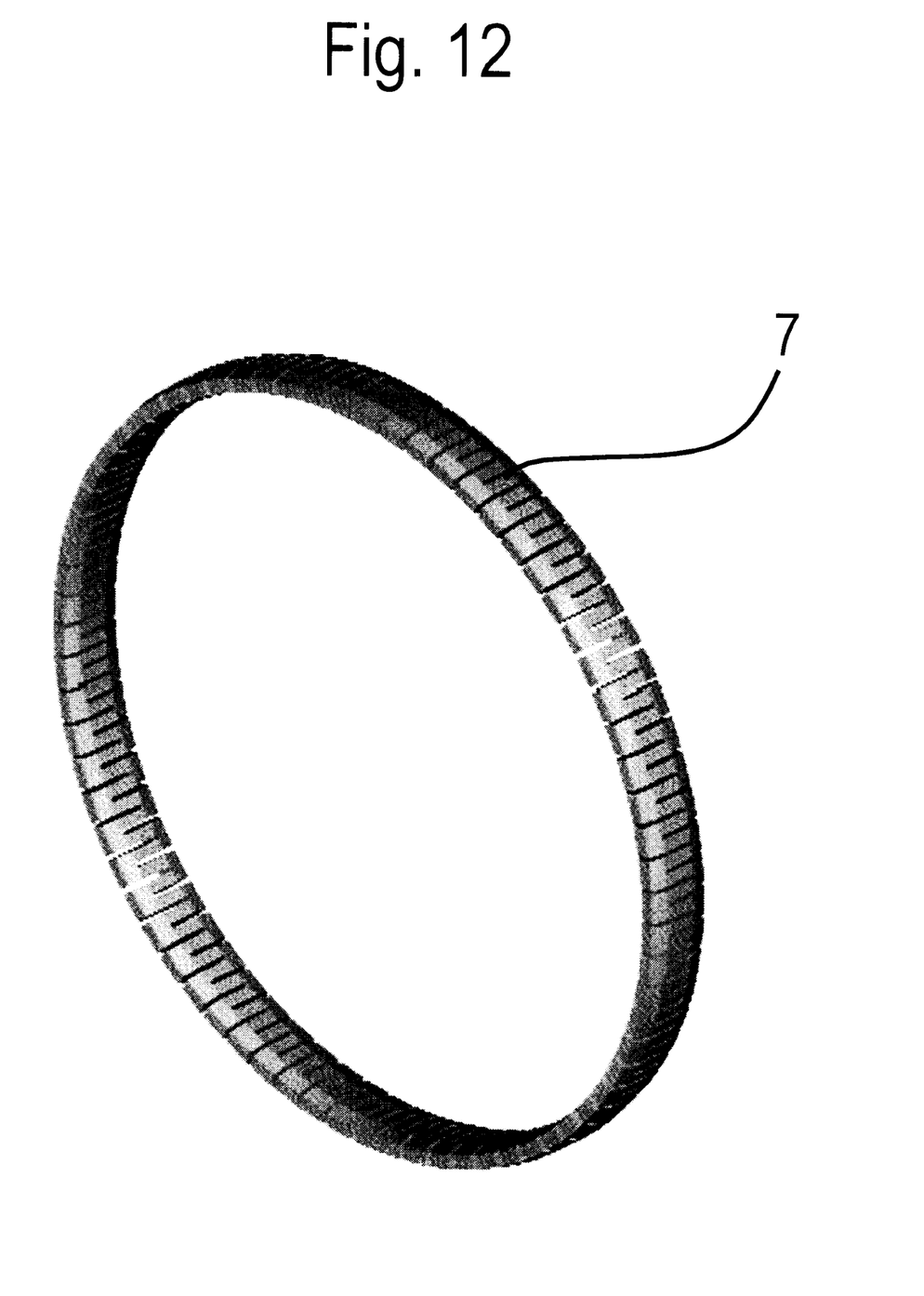
FIG. 12 shows perspective view of the spring ring shown in FIG. 1.

The spring ring shown in FIGS. 1 and 12 consists essentially of a meander-shaped square plate with a convex surface.

Figure 13:
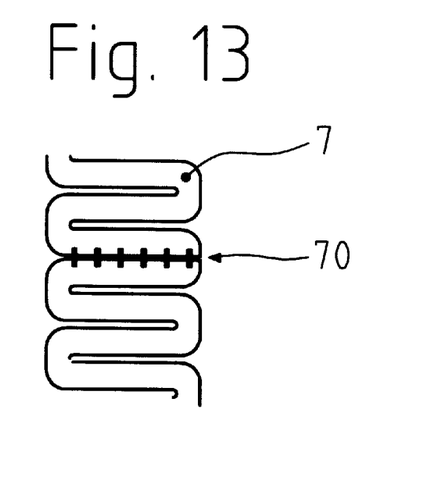
FIG. 13 shows plan view of another spring ring.

However, a meander-shaped strip may also be used as a spring ring 7, as indicated in FIG. 13. To create this spring ring 7, the ends of the meander-shaped strip are connected to one another, as in FIG. 13, at a welding point 70.

Figure 14:
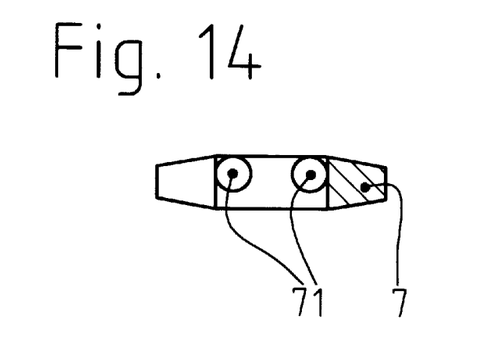
FIG. 14 shows a third spring ring in a sectional view.
Figure 15:
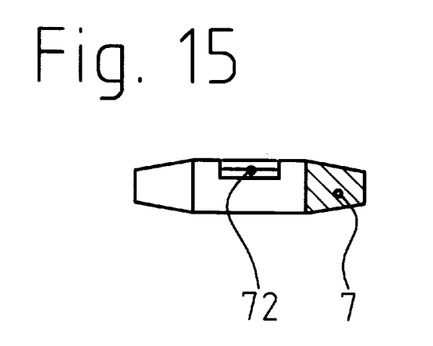
FIG. 15 shows a fourth spring ring in a sectional view.

To amplify the spring effect, the spring ring 7 may comprise additional springs. These can, for example, be helical springs 71 surrounding the spring ring 7, arranged parallel to one another (see FIG. 14), or leaf springs 72 (see FIG. 15).

Figure 16:
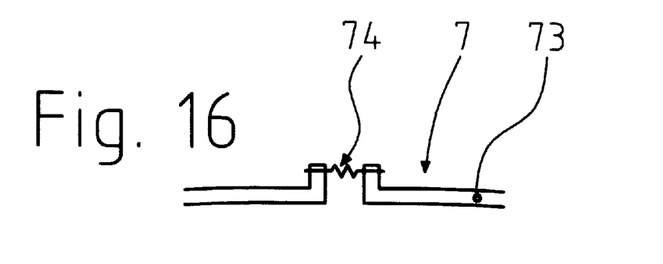
FIG. 16 shows a schematic representation of a fifth spring ring.

The embodiment shown in FIG. 16 of a spring ring 7 comprises a slotted metal strip 73, in which the ends delimiting the slot are compressed by a helical spring 74. This latter spring ring 7 is characterized by its particularly economical manufacture and by good adaptability of the spring constant. The spring constant of this spring ring 7 can be adapted by a variation of the helical spring 74, and, by the provision of additional slots and helical springs.

Accordingly, while a few embodiments of the present invention have been shown and described, it is to be understood that many changes and modifications may be made thereunto without departing from the spirit and scope of the invention as defined in the appended claims.

What is claimed is:

1. A friction plate damper comprising:
   a primary plate;
   secondary plate disposed adjacent to said primary plate;
   a friction device for controlling a speed dependent friction, wherein said friction device includes at least one contact arrangement, which is subjected to a force in an essentially radial manner;
   at least one spring element, disposed on said friction control device, which actuates with a rotational speed-dependent force in an essentially radial manner on said contact arrangement to couple said friction device to said primary plate; and
   a coupling friction plate comprising a securing device securing a set of two coupling friction plate surfaces to said primary plate.

2. The friction plate damper according to claim 1, wherein said spring element exerts a radial force on said contact arrangement during at least low rotational speeds of the friction plate damper.

3. The friction plate damper according to claim 1, wherein said friction device interacts by friction with said secondary plate at low rotational speeds, and is driven by said primary plate.

4. The friction plate damper according to claim 1, wherein said spring element is rotationally coupled by means of a carrier element of said primary plate or said friction device to either said primary plate or said friction device.

5. The friction plate damper according to claim 1, wherein said radially engaging spring element engages by friction with said contact arrangement, for applying a radial force.

6. The friction plate damper according to claim 1, wherein said friction plate damper includes a device which in at least one direction, delimits the relative rotation between said friction device and said secondary plate.

7. The friction plate damper according claim 1, wherein said primary plate and said friction device interact by means of a spring device, which is designed so that it inclines said friction device to bring said friction device into an initial position in relation to said primary plate.

8. The friction plate damper according to one of claim 1, wherein said friction device comprises a friction plate.

9. The friction plate damper according to claim 8, wherein said friction plate engages by friction with a radial surface to the secondary plate.

10. The friction plate damper according to claim 8, wherein said friction plate yields in the axial direction.

11. The friction plate damper according to claim 8, wherein said friction plate is rigid in its plate plane.

12. A friction plate damper comprising:
   a primary plate;
   a secondary plate disposed adjacent to said primary plate;
   a friction control device for interacting with said primary plate and said secondary plate for a rotation speed-dependent control of the friction, wherein said friction control device interacts by friction with said secondary plate, and is rotatably mounted by a small angle in relation to said primary plate, wherein said friction control device comprises at least one rotational speed-dependent coupling element between said primary plate and said friction device; and
   a coupling friction plate comprising a securing device securing a set of two coupling friction plate surfaces to said primary plate.

13. The friction plate damper according to claim 2, wherein said rotational speed-dependent coupling element comprises a radially engaging a spring element.

14. The friction plate damper according to claim 13, wherein said radially engaging spring element is in contact at an external point of said friction device and said primary plate.

15. A friction plate damper comprising:
   a primary plate;
   a secondary plate disposed adjacent to said primary plate;
   a friction device for controlling a speed dependent friction, wherein said friction device includes at least one contact arrangement, which is subjected to a force in an essentially radial manner; and
   at least one spring element, comprising a spring ring, disposed on said friction control device and extending in a radial manner, wherein said spring ring actuates with a rotational speed-dependent force in an essentially radial manner on said contact arrangement.

16. The friction plate damper according to claim 15, wherein said spring ring comprises a metal slotted ring.

17. The friction plate damper according to claim 6, wherein said spring ring comprises a spring which is located in both sides of said slot in said ring, and presses said ring together at its ends which delimits said slot.

18. The friction plate damper according to claim 16, further comprising a circumferential spring wherein said slotted ring is encompassed radially in an outside region by said circumferential spring selected from a group consisting of a helical spring or a leaf spring.

19. The friction plate damper according to claim 15, wherein said spring ring comprises a meander shaped strip or a meander shaped square-section plate.

20. The friction plate damper according to claim 16, wherein said spring ring comprises a circumferential spring, preferably a helical spring or a leaf spring.

21. The friction plate damper according to claim 15, wherein said spring ring includes at least one element made of brass or a material having a deadweight higher than that of steel.

22. The friction plate damper according claim 15, wherein said spring ring includes a convex surface formed radially on its interior surface.

23. The friction plate damper according to claim 15, wherein said contact arrangement of the friction device includes a concave surface formed radially on its outside surface.

24. A friction plate damper comprising:
   a primary plate;
   a secondary plate;
   a friction device for controlling a speed-dependent friction, wherein said friction device includes at least one contact arrangement, which is subject to a force in an essentially radial manner;
   a least one spring element, disposed on said friction control device which actuates with a rotational speed-dependent force in an essentially radial manner on said contact arrangement; and
   a rotation delimiter comprising a stop disposed on said friction plate and a second stop disposed on said secondary plate wherein said stop on said friction plate comes into contact with said stop on said friction plate at a specific angle of rotation.

* * * * *